United States Patent
Lee et al.

(10) Patent No.: US 11,271,725 B2
(45) Date of Patent: Mar. 8, 2022

(54) ELECTRONIC DEVICE AND TRANSACTION PERFORMING METHOD USING SAME

(71) Applicant: Samsung Electronics Co., Ltd, Suwon-si (KR)

(72) Inventors: Hojung Lee, Seoul (KR); Hyunsoo An, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 228 days.

(21) Appl. No.: 16/494,741

(22) PCT Filed: Feb. 2, 2018

(86) PCT No.: PCT/KR2018/001416
§ 371 (c)(1),
(2) Date: Sep. 16, 2019

(87) PCT Pub. No.: WO2018/169204
PCT Pub. Date: Sep. 20, 2018

(65) Prior Publication Data
US 2020/0099516 A1    Mar. 26, 2020

(30) Foreign Application Priority Data
Mar. 16, 2017    (KR) .................. 10-2017-0033015

(51) Int. Cl.
*H04L 9/08* (2006.01)
*H04L 9/06* (2006.01)

(52) U.S. Cl.
CPC .......... *H04L 9/0816* (2013.01); *H04L 9/0643* (2013.01); *H04L 9/088* (2013.01); *H04L 9/0891* (2013.01)

(58) Field of Classification Search
CPC .. G06F 3/0608; G06F 21/604; G06F 16/2246; G06F 3/0604; G06F 3/0631;
(Continued)

(56) References Cited

U.S. PATENT DOCUMENTS 8,281,144 B2    10/2012    Huh et al.
9,271,320 B2    2/2016    Lim et al.
(Continued)

FOREIGN PATENT DOCUMENTS

KR    10-1263392 B1    5/2013
KR    10-1615137 B1    5/2016
(Continued)

OTHER PUBLICATIONS

International Search Report dated Jul. 3, 2018 in connection with International Patent Application No. PCT/KR2018/001416, 2 pages.
(Continued)

*Primary Examiner* — J. Brant Murphy

(57) ABSTRACT

An electronic device is disclosed. The disclosed electronic device includes a communication unit for communicating with a server and at least one external electronic device, and a processor electrically coupled with the communication unit, and the processor may receive the latest communication connection information of the external electronic device from the external electronic device or the server through the communication unit, if a transaction occurs, propagate the transaction to the external electronic device based on the communication connection information, receive a verification result of the transaction from the external electronic device which receives the transaction, and perform the transaction by generating and propagating new block data based on the verification result.

19 Claims, 14 Drawing Sheets

(58) Field of Classification Search
CPC ...... G06F 3/0673; G06F 21/554; G06F 3/067; G06F 2221/2141; G06F 2221/034
See application file for complete search history.

(56) References Cited

U.S. PATENT DOCUMENTS

| | | | |
|---|---|---|---|
| 2004/0222699 A1* | 11/2004 | Bottomley | B60R 25/24 307/9.1 |
| 2013/0006848 A1* | 1/2013 | Kuttuva | G06Q 20/3276 705/39 |
| 2014/0115493 A1* | 4/2014 | Kim | G07C 9/00571 715/748 |
| 2015/0294308 A1 | 10/2015 | Pauker et al. | |
| 2015/0310424 A1 | 10/2015 | Myers | |
| 2016/0004846 A1* | 1/2016 | Nakano | H04L 63/108 726/27 |
| 2016/0080380 A1 | 3/2016 | Dawoud Shenouda Dawoud et al. | |
| 2016/0261685 A1* | 9/2016 | Chen | H04L 41/28 |
| 2017/0046698 A1* | 2/2017 | Haldenby | G06Q 20/4016 |
| 2017/0324738 A1* | 11/2017 | Hari | H04L 63/08 |
| 2018/0096360 A1* | 4/2018 | Christidis | G06Q 20/02 |

FOREIGN PATENT DOCUMENTS

| | | | | |
|---|---|---|---|---|
| KR | 10-1660627 B1 | | 9/2016 | |
| KR | 101660627 B1 | * | 9/2016 | |
| KR | 10-1701131 B1 | | 2/2017 | |
| WO | 2012/177002 A2 | | 12/2012 | |
| WO | WO-2012177002 A2 | * | 12/2012 | ............ H04W 76/14 |

OTHER PUBLICATIONS

Written Opinion of the International Searching Authority dated Jul. 3, 2018 in connection with International Patent Application No. PCT/KR2018/001416, 7 pages.

Satoshi Nakamoto, "Bitcoin: A Peer-to-Peer Electronic Cash System", 2008, 9 pages.

* cited by examiner

ELECTRONIC DEVICE AND TRANSACTION PERFORMING METHOD USING SAME

CROSS-REFERENCE TO RELATED APPLICATIONS

This application is a 371 of International Application No. PCT/KR2018/001416 filed on Feb. 2, 2018, which claims priority to Korean Patent Application No. 10-2017-0033015 filed on Mar. 16, 2017, the disclosures of which are herein incorporated by reference in their entirety.

BACKGROUND

1. Field

Various embodiments of the present disclosure relate to an apparatus and a method for conducting a transaction in an electronic device.

2. Description of Related Art

With recent advances of communication technology, a smart key for releasing a door lock has been developed by generating a key capable of releasing the door lock in an electronic device. Such a smart key may be utilized in various fields to block or release user's access to a vehicle, a house, and an office as necessary.

Meanwhile, the smart key may share the key with other user, and a system for conducting the transaction for the key is required to share the key.

The present disclosure is to, if a transaction for accessing a key to a door lock, sharing the key with other user, and returning or delegating the key occurs, reduce load of resource in managing the key, by verifying the transaction and conducting the transaction in a service provider device (e.g., a door lock, a vehicle, a computer, etc.) connected via communication.

SUMMARY

An electronic device according to various embodiments of the present disclosure includes a communication unit for communicating with a server and at least one external electronic device and a processor electrically coupled with the communication unit, and the processor may receive the latest communication connection information of the external electronic device from the external electronic device or the server through the communication unit, if a transaction occurs, propagate the transaction to the external electronic device based on the communication connection information, receive a verification result of the transaction from the external electronic device which receives the transaction, and perform the transaction by generating and propagating new block data based on the verification result.

The block data may include one or more transactions. The block data may include create time of the block data. The block data may include version information of rules which the block data follows. The block data may include a hash value of previous block data, or a hash value of current block data.

The electronic device may generate block data by adding the verified transaction into new block data to generate. The electronic device may propagate the generated block data to the external electronic device. The transaction may include key information.

The transaction may include access, share, delegate and return of the key. The transaction may include position information for using the key. The transaction may include share count of the key. The transaction may include version information of a rule which the block data follows. The transaction may include information for searching for a transaction which receives the key. The transaction may include information for searching for a previous transaction. The transaction may include information representing the transaction. The electronic device may prove that there is no alteration in the transaction using the information representing the transaction.

A transaction performing method of an electronic device according to various embodiments of the present disclosure may include receiving block data including the latest communication connection information of an external electronic device from the external electronic device or a server, if a transaction occurs, propagating the transaction to the external electronic device based on the communication connection information, receiving a verification result of the transaction from the external electronic device which receives the transaction, and performing the transaction by generating and propagating new block data based on the verification result.

The transaction may include a key. The transaction may include create time of the transaction. The transaction may include access, share, delegate and return of the key. The transaction may include position information for using the key. The transaction may include access or share count of the key. Performing the transaction may generate block data by adding the verified transaction into new block data to generate.

The method may further include propagating the generated block data to the external electronic device. Performing the transaction may perform the transaction by identifying that the block data is propagated.

The method may further include, by sharing, delegating or returning the transaction, distributing and managing rights by generating another new transaction in the distributed rights.

Managing may manage the key without modifying existing block data or an existing transaction.

The transaction may include receiver information, and set one or more receivers.

The method may, if several receivers are set, manage the key in common.

An electronic device according to various embodiments of the present disclosure, which verifies a transaction and performs the transaction for a key via an external device communicatively connected, may enable the verification work separately from a central system (e.g., a server) and thus load of the central system.

DETAILED DESCRIPTION

Figure 1:
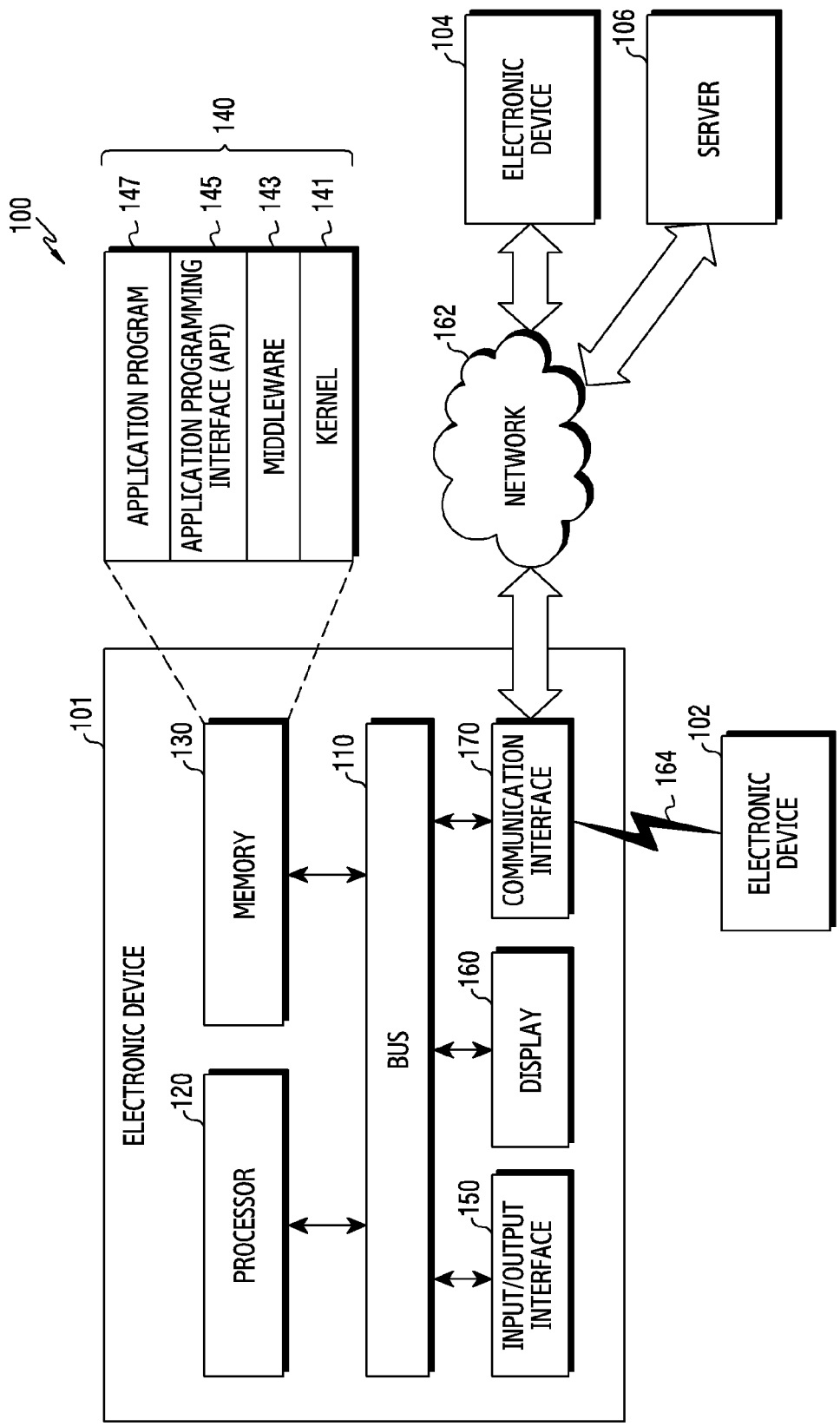
FIG. 1 is a diagram illustrating an electronic device in a network environment in various embodiments.

Hereinafter, various embodiments of the present disclosure will be described with reference to the accompanying drawings. Various embodiments and terms used herein do not limit various embodiments of the present disclosure to the particular forms, and should be understood to include various modifications, equivalents, and/or alternatives of the corresponding embodiments. In the description of the drawings, identical or similar reference numerals are used to designate identical or similar elements. It is to be understood that the singular forms may include plural referents unless the context clearly dictates otherwise. In the present disclosure, an expression such as "A or B," or "at least one of A and B" may include all possible combinations of the listed items. Expressions such as "first," "second," "primarily," or "secondary," as used herein, may represent various elements regardless of order and/or importance and do not limit corresponding elements. The expressions may be used for distinguishing one element from another element. When it is described that an element (such as a first element) is "(operatively or communicatively) coupled" to or "connected" to another element (such as a second element), the element can be directly connected to the other element or can be connected through another element (such as a third element).

An expression "configured to (or set)" used in the present disclosure may be used interchangeably with, for example, "suitable for," "having the capacity to," "designed to," "adapted to," "made to," or "capable of" according to a situation. A term "configured to (or set)" does not only mean "specifically designed to" by hardware. Alternatively, in some situations, the expression "apparatus configured to" may mean that the apparatus "can" operate together with another apparatus or component. For example, a phrase "a processor configured (or set) to perform A, B, and C" may be at a dedicated processor (such as an embedded processor) for performing a corresponding operation or a generic-purpose processor (such as a Central Processing Unit (CPU) or an application processor) that can perform a corresponding operation by executing at least one software program stored at a memory device.

An electronic device according to embodiments of the present disclosure, may be embodied as, for example, at least one of a wire/wireless router, a wireless router, a Wi-Fi router, a repeater, a portable repeater, or an internet router, that comprise an access point. In another embodiment, the electronic device may be embodied at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), an MPEG 3 (MP3) player, a medical equipment, a camera, and a wearable device that provide a hotspot function. The wearable device can include at least one of an accessory type (e.g., a watch, a ring, a bracelet, an ankle bracelet, a necklace, glasses, a contact lens, or a Head-Mounted-Device (HMD)), a fabric or clothing embedded type (e.g., electronic garments), a body attachable type (e.g., a skin pad or a tattoo), and an implantable circuit. The electronic device may be embodied as at least one of, for example, a television, a Digital Versatile Disc (DVD) player, an audio device, a refrigerator, an air-conditioner, a cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, and an electronic frame.

In another embodiment, the electronic device may be embodied as at least one of various medical devices (such as, various portable medical measuring devices (a blood sugar measuring device, a heartbeat measuring device, a blood pressure measuring device, or a body temperature measuring device), a Magnetic Resonance Angiography (MRA) device, a Magnetic Resonance Imaging (MRI) device, a Computed Tomography (CT) device, a scanning machine, and an ultrasonic wave device), a navigation device, a Global Navigation Satellite System (GNSS), an Event Data Recorder (EDR), a Flight Data Recorder (FDR), a vehicle infotainment device, electronic equipment for ship (such as, a navigation device for ship and gyro compass), avionics, a security device, a head unit for a vehicle, an industrial or home robot, a drone, an Automated Teller Machine (ATM) of a financial institution, a Point Of Sales (POS) device of a store, and an Internet of Things (IoT) device (e.g., a light bulb, various sensors, a sprinkler device, a fire alarm, a thermostat, a street light, a toaster, sports equipment, a hot water tank, a heater, and a boiler). According to an embodiment, the electronic device may be embodied as at least one of a portion of furniture, building/construction or vehicle, an electronic board, an electronic signature receiving device, a projector, and various measuring devices (e.g., water supply, electricity, gas, or electric wave measuring device). An electronic device, according to an embodiment, can be a flexible electronic device or a combination of two or more of the foregoing various devices. An electronic device, according to an embodiment of the present disclosure, is not limited to the foregoing devices may be embodied as a newly developed electronic device. The term "user", as used herein, can refer to a person using an electronic device or a device using an electronic device (e.g., an artificial intelligence electronic device).

Referring to FIG. 1, an electronic device 101 resides in a network environment 100. The electronic device 101 can include a bus 110, a processor 120, a memory 130, an input/output interface 150, a display 160, and a communication interface 170. The electronic device 101 may be provided without at least one of the components, or may include at least one additional component. The bus 110 can include a circuit for connecting the components 120 through 170 and delivering communication signals (e.g., control messages or data) therebetween. The processor 120 can include one or more of a CPU, an application processor, and a Communication Processor (CP). The processor 120, for example, can perform an operation or data processing with respect to control and/or communication of at least another component of the electronic device 101.

The memory 130 can include a volatile and/or nonvolatile memory. The memory 130, for example, can store commands or data relating to at least another component of the electronic device 101. According to an embodiment, the memory 130 can store software and/or a program 140. The program 140 can include, for example, a kernel 141, middleware 143, an Application Programming Interface (API) 145, and/or an application program (or "application") 147. At least part of the kernel 141, the middleware 143, or the API 145 can be referred to as an Operating System (OS). The kernel 141 can control or manage system resources (e.g., the bus 110, the processor 120, or the memory 130) used for performing operations or functions implemented by the other programs (e.g., the middleware 143, the API 145, or the application program 147). Additionally, the kernel 141 can provide an interface for controlling or managing system resources by accessing an individual component of the electronic device 101 from the middleware 143, the API 145, or the application program 147.

The middleware 143, for example, can serve an intermediary role for exchanging data between the API 145 or the application program 147 and the kernel 141 through communication. Additionally, the middleware 143 can process one or more job requests received from the application program 147, based on their priority. For example, the middleware 143 can assign a priority for using a system resource (e.g., the bus 110, the processor 120, or the memory 130) of the electronic device 101 to at least one of the application programs 147, and process the one or more job requests. The API 145, as an interface through which the application 147 controls a function provided from the kernel 141 or the middleware 143, can include, for example, at least one interface or function (e.g., an instruction) for file control, window control, image processing, or character control. The input/output interface 150, for example, can deliver commands or data inputted from a user or another external device to other component(s) of the electronic device 101, or output commands or data inputted from the other component(s) of the electronic device 101 to the user or another external device.

The display 160, for example, can include a Liquid Crystal Display (LCD), a Light Emitting Diode (LED) display, an Organic Light Emitting Diode (OLED) display, a MicroElectroMechanical Systems (MEMS) display, or an electronic paper display. The display 160, for example, can display various contents (e.g., texts, images, videos, icons, and/or symbols) to the user. The display 160 can include a touch screen, for example, and receive touch, gesture, proximity, or hovering inputs by using an electronic pen or a user's body part. The communication interface 170, for example, can set a communication between the electronic device 101 and an external device (e.g., a first external electronic device 102, a second external electronic device 104, or a server 106). For example, the communication interface 170 can communicate with the external device (e.g., the second external electronic device 104 or the server 106) over a network 162 through wireless communication or wired communication.

The wireless communication, for example, can include cellular communication using at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM). The wireless communication can include, for example, at least one of Wireless Fidelity (WiFi), Bluetooth, Bluetooth Low Energy (BLE), Zigbee, Near Field Communication (NFC), magnetic secure transmission, Radio Frequency (RF), and Body Area Network (BAN). The wireless communication can include GNSS. The GNSS can include, for example, Global Positioning System (GPS), Global Navigation Satellite System (GLONASS), Beidou navigation satellite system (Beidou), or Galileo (the European global satellite-based navigation system). Hereafter, the GPS can be interchangeably used with the GNSS. The wired communication, for example, can include at least one of Universal Serial Bus (USB), High Definition Multimedia Interface (HDMI), Recommended Standard 232 (RS-232), power line communications, and Plain Old Telephone Service (POTS). The network 162 can include a telecommunications network, for example, at least one of computer network (e.g., LAN or WAN), Internet, and telephone network.

Each of the first and second external electronic devices 102 and 104 can be of the same as or of a different type from that of the electronic device 101. According to embodiments of the present disclosure, all or part of operations executed in the electronic device 101 can be executed by another electronic device or a plurality of electronic devices (e.g., the electronic device 102 or 104, or the server 106). To perform a function or service automatically or by request, instead of performing the function or the service by the electronic device 101, the electronic device 101 can request at least part of a function relating thereto from another device (e.g., the electronic device 102 or 104, or the server 106). The other electronic device (e.g., the electronic device 102 or 104, or the server 106) can perform the requested function or an additional function and send its result to the electronic device 101. The electronic device 101 can provide the requested function or service by processing the received result. In doing so, for example, cloud computing, distributed computing, or client-server computing techniques can be used.

Figure 2:
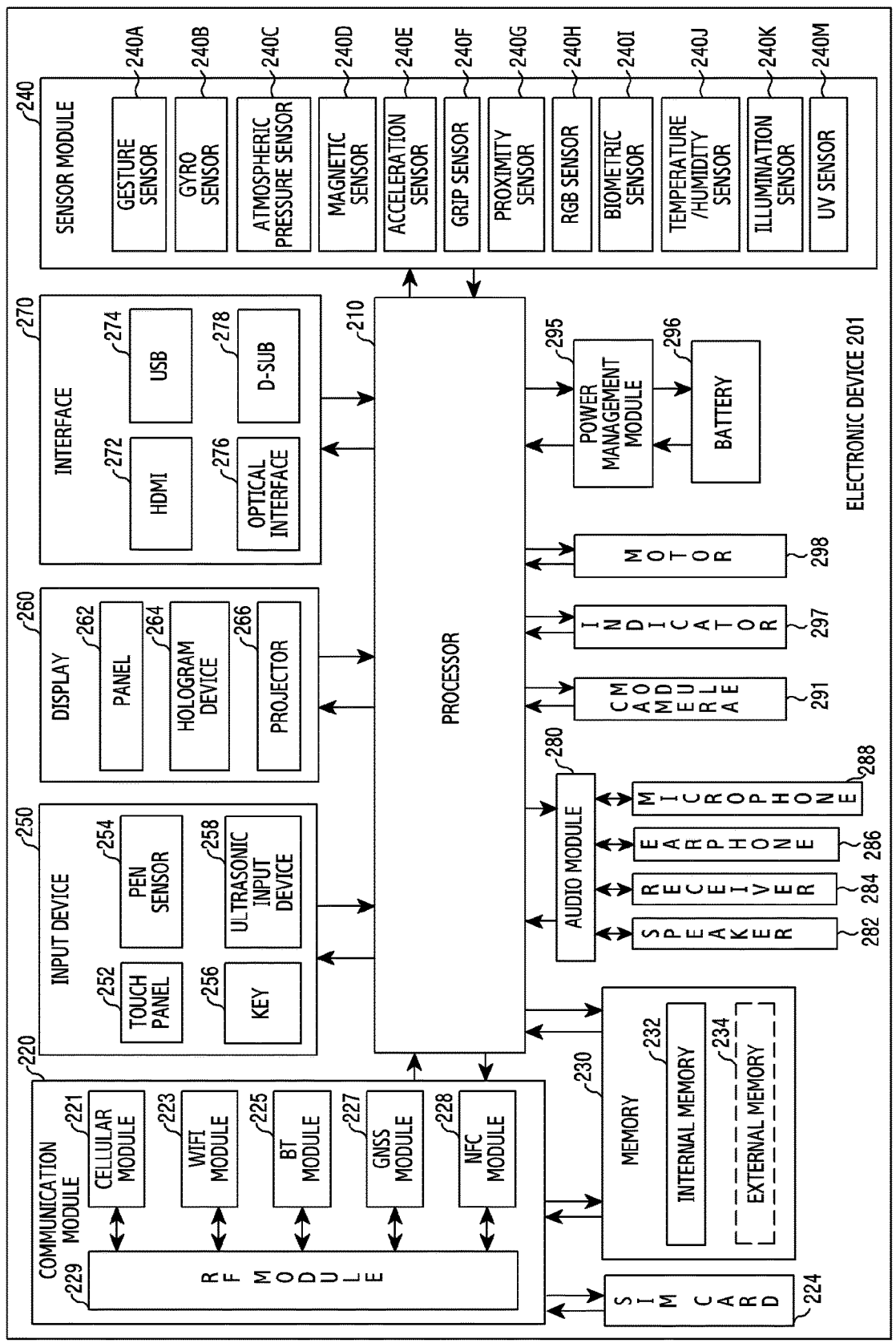
FIG. 2 is a block diagram of an electronic device according to various embodiments.

FIG. 2 is a block diagram of an electronic device 201 according to an embodiment of the present disclosure. The electronic device 201, for example, can include all or part of the above-described electronic device 101 of FIG. 1. The electronic device 201 includes one or more processors (e.g., an AP) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298. The processor 210, for example, can control a plurality of hardware or software components connected to the processor 210, and also can perform various data processing and operations by executing an OS or an application program. The processor 210 can be implemented with a System on Chip (SoC), for example. The processor 210 can further include a Graphic Processing Unit (GPU) and/or an image signal processor. The processor 210 may include at least part (e.g., a cellular module 221) of the components shown in FIG. 2. The processor 210 can load commands or data received from at least one other component (e.g., a nonvolatile memory) into a volatile memory, process them, and store various data in the nonvolatile memory.

The communication module 220 (e.g., the communication interface 170) can have the same or similar configuration to the communication interface 170 of FIG. 1. The communication module 220 can include, for example, the cellular module 221, a WiFi module 223, a Bluetooth (BT) module 225, a GNSS module 227, an NFC module 228, and an RF module 229. The cellular module 221, for example, can provide voice call, video call, Short Message Service (SMS), or Internet service through a communication network. The cellular module 221 can identify and authenticate the electronic device 201 in a communication network by using the SIM (e.g., a SIM card) 224. The cellular module 221 can perform at least part of a function that the processor 210 provides. The cellular module 221 can further include a CP. At least some (e.g., two or more) of the cellular module 221, the WiFi module 223, the BT module 225, the GNSS module 227, and the NFC module 228 can be included in one Integrated Circuit (IC) or an IC package. The RF module 229, for example, can transmit/receive a communication signal (e.g., an RF signal). The RF module 229, for example, can include a transceiver, a Power Amp Module (PAM), a frequency filter, a Low Noise Amplifier (LNA), or an antenna. According to another embodiment, at least one of the cellular module 221, the WiFi module 223, the BT module 225, the GNSS module 227, and the NFC module 228 can transmit/receive an RF signal through an additional RF module. The SIM 224, for example, can include a card including a SIM or an embedded SIM, and also can contain unique identification information (e.g., an Integrated Circuit Card Identifier (ICCID)) or subscriber information (e.g., an International Mobile Subscriber Identity (IMSI)).

The memory 230 (e.g., the memory 130) can include at least one of an internal memory 232 and an external memory 234. The internal memory 232 can include at least one of, for example, a volatile memory (e.g., Dynamic RAM (DRAM), Static RAM (SRAM), or Synchronous Dynamic RAM (SDRAM)), and a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, flash memory, hard drive, and solid state drive (SSD)). The external memory 234 can include flash drive, for example, Compact Flash (CF), Secure Digital (SD), micro SD, mini SD, extreme digital (xD), Multi-Media Card (MMC), or memory stick. The external memory 234 can be functionally or physically connected to the electronic device 201 through various interfaces.

The sensor module 240 can, for example, measure physical quantities or detect an operating state of the electronic device 201, and thus convert the measured or detected information into electrical signals. The sensor module 240 can include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a Red, Green, Blue (RGB) sensor), a bio sensor 240I, a temperature/humidity sensor 240J, an illumination sensor 240K, and an Ultra Violet (UV) sensor 240M. Additionally or alternately, the sensor module 240 can include an E-nose sensor, an Electromyography (EMG) sensor, an Electroencephalogram (EEG) sensor, an Electrocardiogram (ECG) sensor, an InfraRed (IR) sensor, an iris sensor, and/or a fingerprint sensor. The sensor module 240 can further include a control circuit for controlling at least one sensor therein. The electronic device, as part of the processor 210 or individually, can further include a processor configured to control the sensor module 240 and thus control the sensor module 240 while the processor 210 is sleeping.

The input device 250 can include at least one of a touch panel 252, a (digital) pen sensor 254, a key 256, and an ultrasonic input device 258. The touch panel 252 can use at least one of, for example, capacitive, resistive, infrared, and ultrasonic methods. Additionally, the touch panel 252 can further include a control circuit. The touch panel 252 can further include a tactile layer to provide a tactile response to a user. The (digital) pen sensor 254 can include, for example, part of a touch panel or a sheet for recognition. The key 256 can include, for example, a physical button, a touch key, an optical key, or a keypad. The ultrasonic input device 258 can detect ultrasonic waves from an input means through a microphone 288 and check data corresponding to the detected ultrasonic waves.

The display 260 (e.g., the display 160) can include at least one of a panel 262, a hologram device 264, a projector 266, and/or a control circuit for controlling them. The panel 262 can be implemented to be flexible, transparent, or wearable, for example. The panel 262 and the touch panel 252 can be configured with one or more modules. The panel 262 can include a pressure sensor (or a force sensor) for measuring a pressure of the user touch. The pressure sensor can be integrated with the touch panel 252, or include one or more sensors separately from the touch panel 252. The hologram device 264 can show three-dimensional images in the air by using the interference of light. The projector 266 can display an image by projecting light on a screen. The screen, for example, can be placed inside or outside the electronic device 201. The interface 270 can include, for example, an HDMI 272, a USB 274, an optical interface 276, or a D-subminiature (D-sub) 278. The interface 270 can be included in, for example, the communication interface 170 of FIG. 1. Additionally or alternately, the interface 270 can include a Mobile High-Definition Link (MHL) interface, a SD card/MMC interface, or an Infrared Data Association (IrDA) standard interface.

The audio module 280, for example, can convert sounds into electrical signals and convert electrical signals into sounds. At least some components of the audio module 280 can be included in, for example, the input/output interface 150 of FIG. 1. The audio module 280 can process sound information inputted or outputted through a speaker 282, a receiver 284, an earphone 286, or the microphone 288. The camera module 291, as a device for capturing still images and videos, can include one or more image sensors (e.g., a front sensor or a rear sensor), a lens, an Image Signal Processor (ISP), or a flash (e.g., an LED or a xenon lamp). The power management module 295, for example, can manage the power of the electronic device 201. According to an embodiment of the present disclosure, the power management module 295 can include a Power Management IC (PMIC), a charger IC, or a battery or fuel gauge, for example. The PMIC can have a wired and/or wireless charging method. The wireless charging method can include, for example, a magnetic resonance method, a magnetic induction method, or an electromagnetic method, and can further include an additional circuit for wireless charging, for example, a coil loop, a resonant circuit, or a rectifier circuit. The battery gauge can measure the remaining capacity of the battery 296, or a voltage, current, or temperature of the battery 296 during charging. The battery 296 can include, for example, a rechargeable battery and/or a solar battery.

The indicator 297 can display a specific state of the electronic device 201 or part thereof (e.g., the processor 210), for example, a booting state, a message state, or a charging state. The motor 298 can convert electrical signals into mechanical vibration and generate a vibration or haptic effect. The electronic device 201 can include a mobile TV supporting device (e.g., a GPU) for processing media data according to standards such as Digital Multimedia Broadcasting (DMB), Digital Video Broadcasting (DVB), or MediaFLOW™. Each of the above-described components of the electronic device can be configured with at least one component and the name of a corresponding component can vary according to the kind of an electronic device. According to an embodiment of the present disclosure, an electronic device (e.g., the electronic device 201) can be configured to include at least one of the above-described components or an additional component, or to not include some of the above-described components. Additionally, some of components in an electronic device are configured as one entity, so that functions of previous corresponding components are performed identically.

Figure 3:
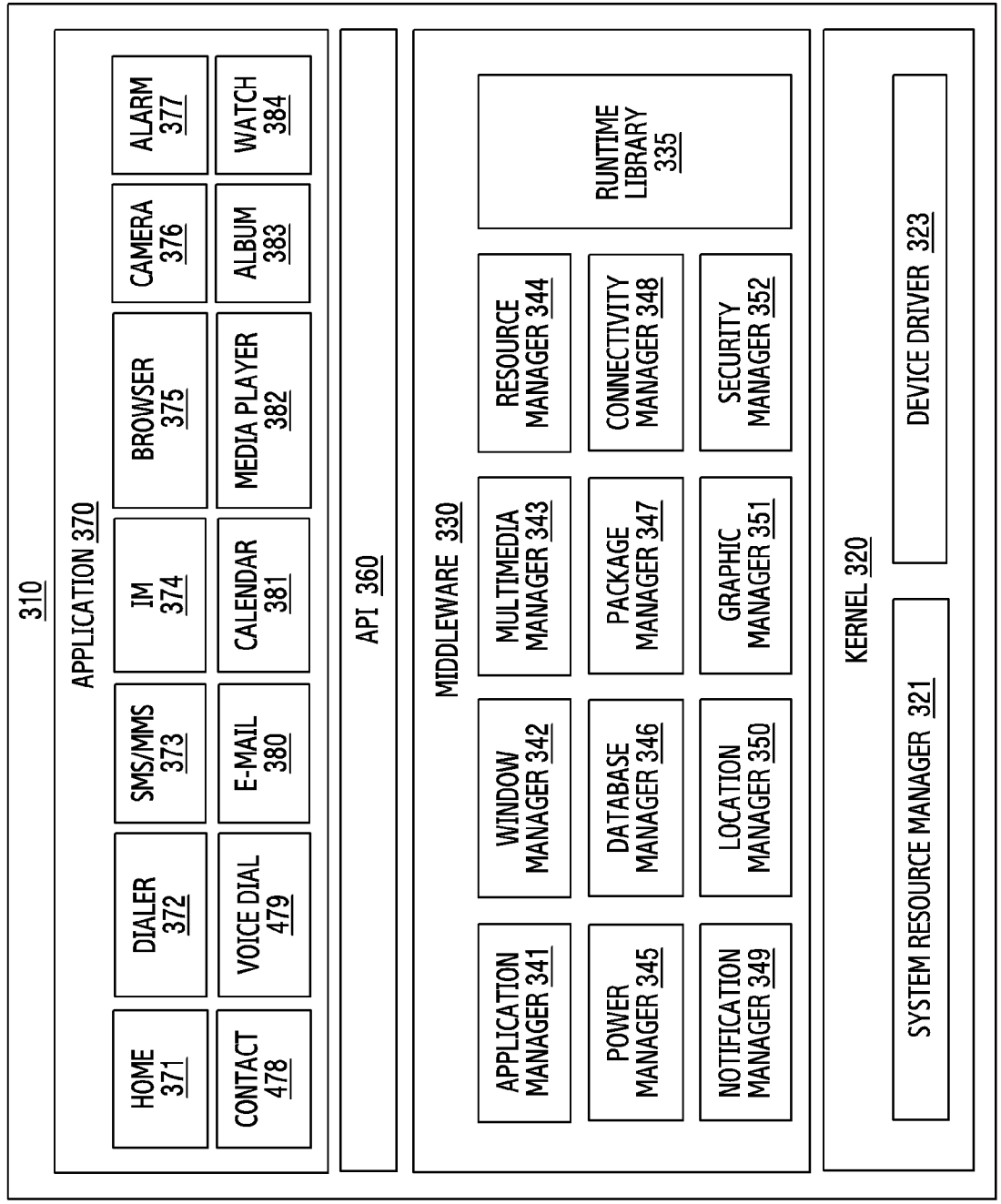
FIG. 3 is a block diagram of a program module according to various embodiments.

FIG. 3 is a block diagram of a program module according to an embodiment of the present disclosure. A program module 310 (e.g., the program 140) can include an OS for controlling a resource relating to an electronic device (e.g., the electronic device 101) and/or various applications (e.g., the application program 147) running on the OS. The OS can include, for example, Android™, iOS™, Windows™, Symbian™, Tizen™, or Bada™. Referring to FIG. 3, the program module 310 can include a kernel 320 (e.g., the kernel 141), a middleware 330 (e.g., the middleware 143), an API 360 (e.g., the API 145), and/or an application 370 (e.g., the application program 147). At least part of the program module 310 can be preloaded on an electronic device or can be downloaded from an external electronic device (e.g., the electronic device 102, 104, or the server 106).

The kernel 320 includes, for example, at least one of a system resource manager 321 and/or a device driver 323. The system resource manager 321 can control, allocate, or retrieve a system resource. According to an embodiment, the system resource manager 321 can include a process management unit, a memory management unit, or a file system management unit. The device driver 323 can include, for example, a display driver, a camera driver, a Bluetooth driver, a sharing memory driver, a USB driver, a keypad driver, a WiFi driver, an audio driver, or an Inter-Process Communication (IPC) driver. The middleware 330, for example, can provide a function commonly required by the application 370, or can provide various functions to the application 370 through the API 360 in order to allow the application 370 to efficiently use a limited system resource inside the electronic device. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 can include, for example, a library module used by a complier to add a new function through a programming language while the application 370 is running. The runtime library 335 can manage input/output, manage memory, or arithmetic function processing. The application manager 341, for example, can manage the life cycle of the applications 370. The window manager 342 can manage a GUI resource used in a screen. The multimedia manager 343 can recognize a format for playing various media files and encode or decode a media file by using the codec in a corresponding format. The resource manager 344 can manage a source code of the application 3740 or a memory space. The power manager 345 can manage the capacity or power of the battery and provide power information for an operation of the electronic device. The power manager 345 can operate together with a Basic Input/Output System (BIOS). The database manager 346 can create, search, or modify a database used in the application 370. The package manager 347 can manage installation or updating of an application distributed in a package file format.

The connectivity manger 348 can manage, for example, a wireless connection. The notification manager 349 can provide an event, such as incoming messages, appointments, and proximity alerts, to the user. The location manager 350 can manage location information of an electronic device. The graphic manager 351 can manage a graphic effect to be provided to the user or a user interface relating thereto. The security manager 352 can provide, for example, system security or user authentication. The middleware 330 can include a telephony manager for managing a voice or video call function of the electronic device, or a middleware module for combining various functions of the above-described components. The middleware 330 can provide a module specialized for each type of OS. The middleware 330 can dynamically delete part of the existing components or add new components. The API 360, as a set of API programming functions, can be provided as another configuration according to the OS. For example, Android or iSO can provide one API set for each platform, and Tizen can provide two or more API sets for each platform.

The application 370 can include at least one of a home 371, a dialer 372, an SMS/Multimedia Messaging System (MMS) 373, an Instant Message (IM) 374, a browser 375, a camera 376, an alarm 377, a contact 378, a voice dial 379, an e-mail 380, a calendar 381, a media player 382, an album 383, a clock 384, health care (e.g., measure an exercise amount or blood sugar level), or environmental information (e.g., air pressure, humidity, or temperature information) provision application. The application 370 can include an information exchange application for supporting information exchange between the electronic device and an external electronic device. The information exchange application can include, for example, a notification relay application for relaying specific information to the external device or a device management application for managing the external electronic device. For example, the notification relay application can relay notification information from another application of the electronic device to an external electronic device, or receive and forward notification information from an external electronic device to the user. The device management application, for example, can install, delete, or update a function (e.g., turn-on/turn off of the external electronic device itself (or some components) or display brightness (or resolution) adjustment) of an external electronic device communicating with the electronic device, or an application operating in the external electronic device. The application 370 can include a specified application (e.g., a health care application of a mobile medical device) according to a property of the external electronic device. The application 370 can include an application received from an external electronic device. At least part of the program module 310 can be implemented (e.g., executed) with software, firmware, hardware (e.g., the processor 210), or a combination of at least two of them, and include a module, a program, a routine, a set of instructions, or a process for executing one or more functions.

Figure 4:
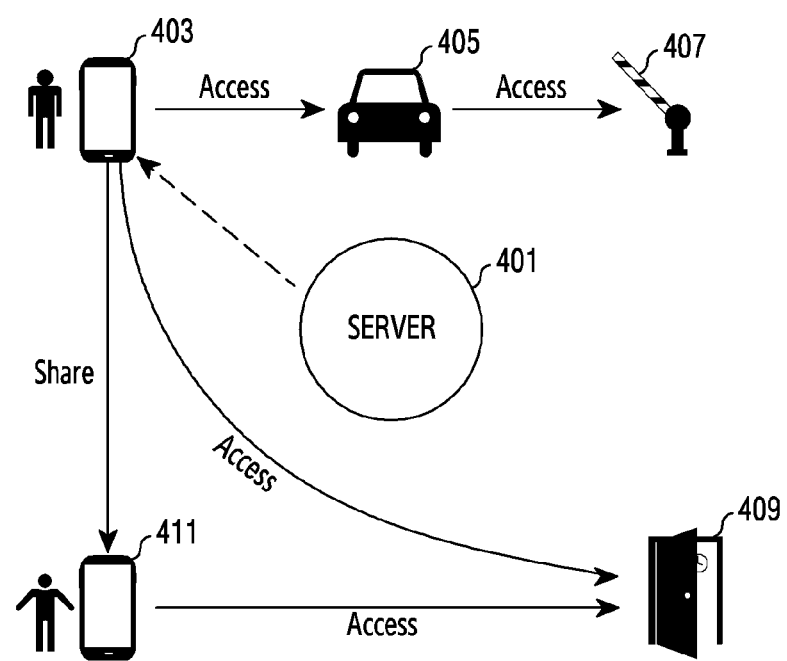
FIG. 4 illustrates an example of transactions between a server, an electronic device and an external electronic device according to various embodiments.

FIG. 4 illustrates an example of transactions between a server, an electronic device and an external electronic device according to various embodiments. The transaction may indicate work for generating a key, or utilizing the generated key.

Referring to FIG. 4, a server 401, a first electronic device 403, a vehicle 405, a gate barrier 407, a door 409 and a second electronic device 411 are depicted.

The server 401, the first electronic device 403, the vehicle 405, the gate barrier 407, the door 409 and the second electronic device 411 may be communicatively connected, and each device 401, 403, 405, 407, 409, and 411 may be a node which constitutes a distributed access control system.

Each node may route and update communication connection information and block data of the node up-to-date and propagate (transmit) the updated block data to other node.

A transaction may include information of the transaction and information for verifying the transaction. A node receiving the transaction may verify whether it is a valid transaction using the transaction information and the information for verifying the transaction included in the transaction, and if the transaction passes the verification, may perform proof of work for generating new block data, by adding to new block data to generate.

The block data may include information of a transaction list (one or more) and the information for verifying the transaction list. A node receiving new block data may verify whether it is valid block data using the transaction list information and the information for verifying the transaction list included in the block data, and if the block data passes the verification, store the new block data in the memory as the latest block data.

Every node 401, 403, 405, 407, 409, and 411 connected on a communication network may manage the latest communication connection information and the block data, and route to each node (e.g., an electronic device). If each electronic device initially accesses or no node is currently known because the last access date is old, the server 401 may serve as a central system which provides the routing to each node (for example, the electronic device). The central system may be a node which exists all the time.

The server 401 may serve as the node after providing the routing.

Meanwhile, the type of the transaction propagated by the first electronic device 403 may include access, sharing, delegate and return.

The access may indicate that, for example, the first electronic device 403 opens a door of the vehicle 405 or starts the engine using the key. In the following description, the term 'access' will be referred to as 'use' for ease of explanation. That is, the meaning that the first electronic device 403 'accesses the key' is the same meaning as 'uses the key'.

The sharing indicates that, for example, the first electronic device 403 copies and gives the key to the second electronic device 411.

The delegate may indicate that, for example, the key stored in the first electronic device 403 is handed over to the second electronic device 411. That is, the first electronic device 403 may transmit the key to the second electronic device 411, and then remove the key from a memory of the first electronic device 403.

The return may indicate that, for example, if receiving the key from the server 401, the first electronic device 403 returns the key to the server 401, and the first electronic device 403 may, after transmitting the key to the server 401, remove the key from the memory of the first electronic device 403.

If the server 401 initially generates the key, the server 401 may propagate routing information and a transaction including the key to each device 403, 405, 407, 409, and 411 communicatively connected.

Each device (hereinafter, referred to as a 'node') may know which information is to be used to verify the transaction by referring to the received transaction.

For example, if the first electronic device 403 opens the door of the vehicle 405 using the key, the vehicle 405, the gate barrier 407, the front door 409, and the second electronic device 411 may verify the transaction including the key information propagated from the first electronic device 403 in order to verify the key to be used by the first electronic device 403.

Each node 405, 407, 409, and 411 performs the verification work by referring to the transaction propagated from the first electronic device 403. The verification work may verify, for example, whether data in the transaction is altered, whether the transaction has right to the key, whether the key is expired, whether a position for the use is restricted, whether it does not exceed an access or share count, and so on. If the verification is finished, the node 405, 407, 409, and 411 which performs the verification propagates a verification result to other node, and includes into new block data to generate.

If the verification is finished at the node over a specific rate, the vehicle 405 may open the door of the vehicle 405.

Meanwhile, if the user in the vehicle 405 approaches to the gate barrier 407, the gate barrier 407 may receive the transaction including the key information from the first electronic device 403, verify whether the received transaction is valid using the node communicatively connected as stated above, and open the gate barrier 407.

In various embodiments as mentioned above, since the verification work on the key is distributed and processed at the node communicatively connected, resource for managing the key may be distributed and thus management load may be reduced. The verification work on the key may be conducted by verifying the transaction including the key information.

An important transaction which delivers the key rights such as the transaction type of share, delegate, and return may be performed by identifying not only the transaction verification but also the propagation of the block data including the transaction, for more secure verification.

Figure 5:
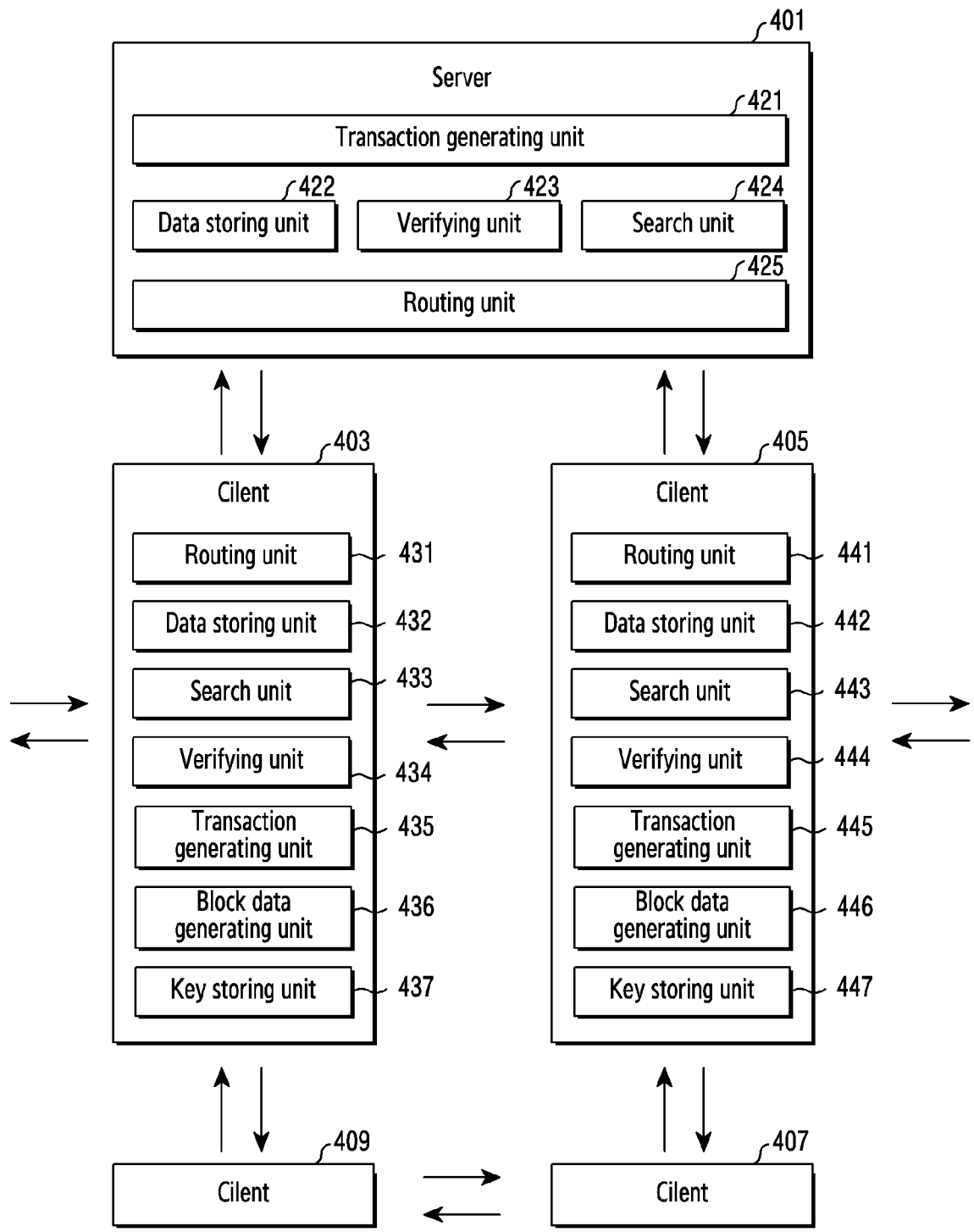
FIG. 5 illustrates a program module operating in a server, an electronic device and an external electronic device according to various embodiments.

FIG. 5 illustrates a program module operating in a server, an electronic device and an external electronic device according to various embodiments.

Referring to FIG. 5, each node 401, 403, 405, 407, and 409 may include a transaction generating unit, a data storing unit, a verifying unit, a search unit and a routing unit.

As for the server 401, for example, the server 401 may operate as the node, and may include a transaction generating unit 421, a data storing unit 422, a verifying unit 423, a search unit 424, and a routing unit 425.

The transaction generating unit 421 may generate a transaction, and propagate the transaction to each node.

The data storing unit 422 is a memory for storing data.

The verifying unit 423 may verify block data or the transaction.

The search unit 424 may search for each node communicatively connected using an address or an ID.

The routing unit 425 may manage, propagate and update information of the node communicatively connected.

Clients 403, 405, 407, and 409 may operate as nodes. For example, it may be a user's smart phone, front door and vehicle.

The client 403 may include a routing unit 431, a data storing unit 432, a search unit 433, a verifying unit 434, a transaction generating unit 435, a block data generating unit 436 and a key storing unit 437. The routing unit 431, the data storing unit 432, the search unit 433, the verifying unit 434, and the transaction generating unit 435 are the same as described above and thus are omitted to avoid overlapping explanation.

Meanwhile, if initially accessing a communication network or knowing no node because the last access date is old, the routing unit 431 of the client 403 may request node information from a central system. The central system may be, for example, a server.

The block data generating unit 436 may generate block data.

The key storing unit 437 stores a key and includes a memory. The key may be included in the transaction.

The client 405 may include a routing unit 441, a data storing unit 422, a search unit 443, a verifying unit 444, a transaction generating unit 445, a block data generating unit 436 and a key storing unit 437. Descriptions on the routing unit 441, the data storing unit 442, the search unit 443, the verifying unit 444, the transaction generating unit 445, the block data generating unit 436 and the key storing unit 437 are the same as described above and thus are omitted in detail.

Figure 6:
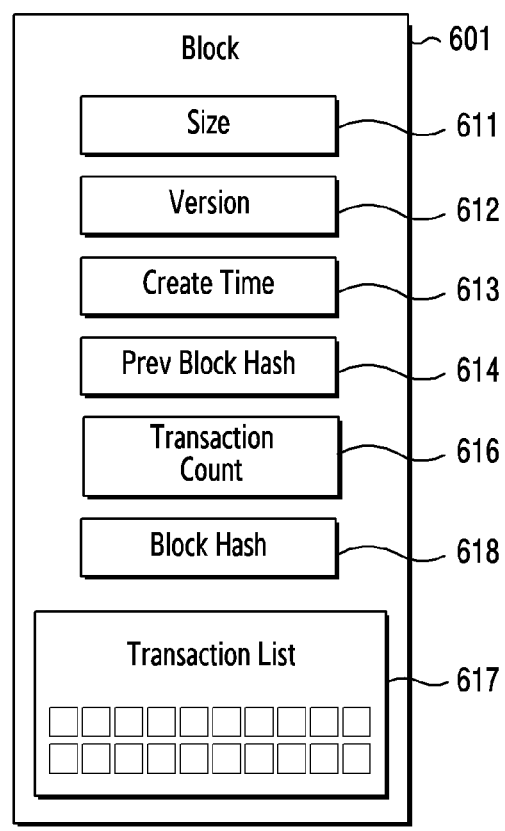
FIG. 6 illustrates a structure of block data according to various embodiments.

FIG. 6 illustrates a structure of block data according to various embodiments.

Referring to FIG. 6, block data 601 may include information relating to block data size 611, version 612, create time 613, hash value 614 of previous block data, transactional count 616, transaction list 617 and hash value 618 of block data.

The version information 612 is version information of rules which corresponding block data follows, and may be processed as invalid if the version is lower than a current version.

The create time 613 information is time when the block data 601 is generated.

The hash value 614 of previous block data is a representative value for finding the previous block data. The representative value may be a hash value or an address or an ID.

The transaction count 616 is information of the total number of transaction lists in the block.

The transaction list 617 may include one or more transactions, and may be a verified transaction. The transaction shall be described separately in FIG. 7.

The generated block data may be linked after the current latest block data as one.

If block data is generated at each node at the same time, the greatest size of the block data may be selected. For example, if the size of the block data generated at a node1 is 200 kilobytes, the size of the block data generated at a node2 is 300 kilobytes, and the size of the block data generated at a node3 is 500 kilobytes, the block data generated at the node3 may be selected. According to an embodiment, if the size of the block data generated at each node is identical, the block data having the earliest time information may be selected by referring to the create time 613 of the block data 601.

Meanwhile, the transaction of the block data not selected may be verified by the node which generates the selected block, and added or processed first if next block data is generated.

If block data created at the same time increases, the simultaneous creation may be reduced by generating a creation rule according to the version rule. For example, the simultaneous creation may be reduced by using a method which permits block data generated after a specific period of time from the create time of the current latest block data.

The hash value 618 of block data is a representative value indicating current block data. The representative value may be a hash value or an address or an ID. For example, if the hash value is used, the hash value may be generated by inserting elements 611, 612, 614, 616, and 617 into the block data, and thus may be used to prove that the block data is not altered.

Figure 7:
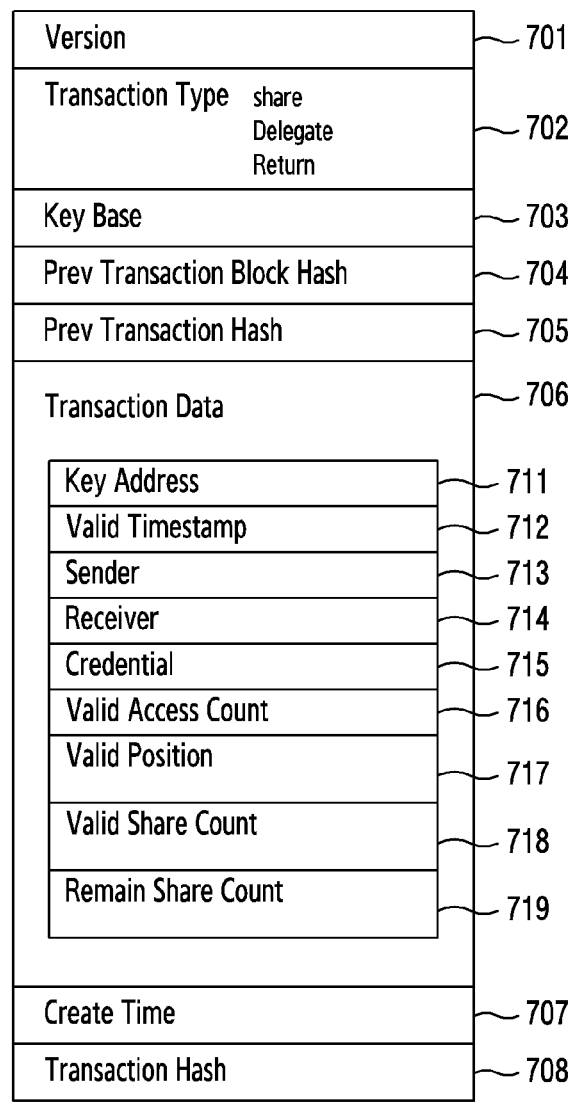
FIG. 7 illustrates an example of share, delegate, and return transactions contained in block data.

FIG. 7 illustrates an example of share, delegate, and return transactions contained in block data.

Referring to FIG. 7 a transaction 700 may include information relating to version 701, transaction type 702, key base 703, block hash value 704 of previous transaction, hash value 705 of previous transaction, transaction data 706, create time 707 and transaction hash value 708.

The version information 701 indicates a version of rules which a corresponding transaction follows, and may be processed as invalid if the version is lower than a current version.

The transaction type 702 indicates the type of the transaction, and may have one value of 'share', 'delegate' or 'return'.

If the transaction type 702 is 'share', it allows both of a user transferring the key and a user receiving the key to use the key. Herein, the 'user' may indicate a 'user's device'.

If the transaction type 702 is 'delegate', the key is received from the user who transfers the key and delegates right of the key. The user transferring the key may remove key information from a memory.

If the transaction type 702 is 'return', the key is returned to the user which transfers the key. The user transferring the key may remove the key information from the memory.

The key base 703 is information indicating from which device and with authorization the key is received, or may be the address of the ID of the transaction containing corresponding information.

If the value of the key base 703 is '0', it is initially generated (e.g., the key is initially digitized and generated), and the initial generation may be conducted only by the central system.

The block hash value 704 of previous transaction is a representative value for finding the block data of the previous transactions of the key. The representative value may be a hash value, an address or an ID.

The hash value 705 of previous transaction is representative value for finding the previous transaction of the key. The representative value may be a hash value, an address or an ID.

For example, if searching for the previous transaction, a block containing the transaction may be identified by searching with the block hash value 704 of previous transaction, and the previous transaction may be identified by searching with the hash value 705 of previous transaction.

The transaction data 706 may include information relating to key address 711, time information 712, sender 713, receiver 714, credential 715, valid access count 716, position information 717, valid share count 718 and remain share count 719.

The key address 711 may be an address or an ID containing key information.

The time information 712 may be time information for using the key.

The sender 713 is a user or an electronic device which transmits the key, and may include an address or an ID. If the sender 713 is the central system, it may indicate that the transaction is initially generated.

The receiver 714 is a user or an electronic device which receives the key, and may include an address or identification information (ID). The receiver 714 may be one or more persons. All of people and the receiver who have rights of a corresponding key may be recorded in the receiver 714. For example, if transaction type 702 is share, the key is shared and accordingly both of the sender and receiver as the receivers may have the key based on a new transaction.

The credential 715 is important information for using the key to transfer to the receiving side, and its type may be a general string type or a byte type or an encrypted type.

The valid access count 716 may indicate the number of times that the electronic device receiving the key accesses the key.

The position information 717 may include position information for using the key.

The share count 718 indicates the number of times for the electronic key receiving the key to share the key. The remain share count 719 indicates the remaining number of times for the electronic device transmitting the key to share the key. The create time 707 information is time when the transaction 700 is generated.

The transaction hash value 708 is a representative value indicating a current transaction. The representative value may be a hash value or an address or ID. For example, if using the hash value, the hash value may be generated by inserting elements 701, 702, 703, 704, 705, and 706 into the block data, and thus may be used to prove that the block data is not altered.

Figure 8:
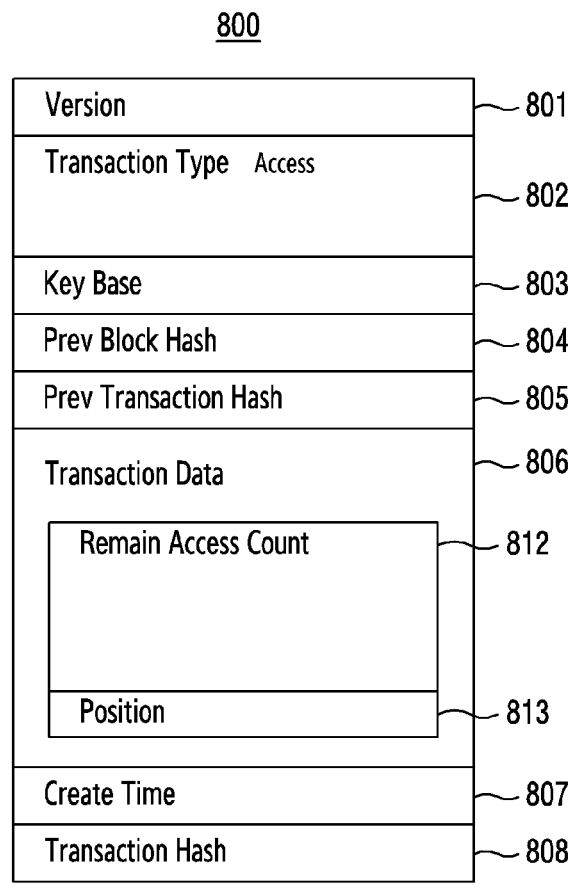
FIG. 8 illustrates an example of an access transaction contained in block data.

FIG. 8 illustrates an example of an access transaction contained in block data.

Referring to FIG. 8, an access transaction 800 may include version 801, transaction type 802, key base 803, block hash value 804 of previous transaction, previous transaction hash value 805, transaction data 806, create time 807, and transaction hash value 808.

Descriptions on the version 801, the transaction type 802, the key base 803, the block hash value 804 of previous transaction, the previous transaction hash value 805, the create time 807, and the transaction hash value 808 are the same as the descriptions of FIG. 7 and are omitted.

The transaction data 806 may include remain access count 812, and/or position information 813.

The remain access count 812 may indicate the number of valid accesses, which remains after the access.

The position information 813 may indicate a current position of the electronic device and include latitude and longitude.

Figure 9:
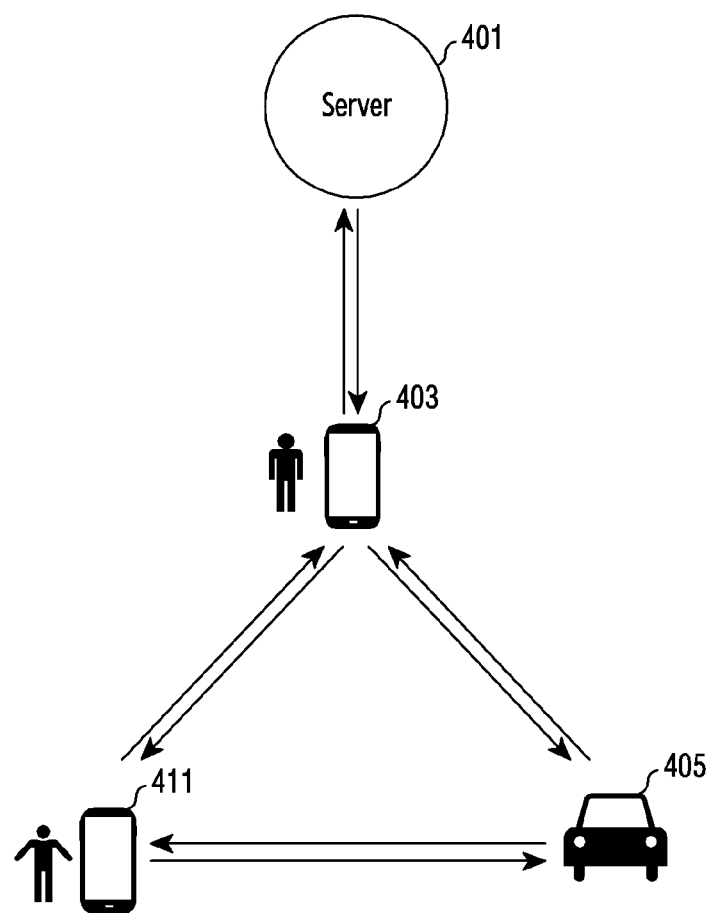
FIG. 9 illustrates an example of a transaction for initially generating a key according to various embodiments.

FIG. 9 illustrates an example of a transaction for initially generating a key according to various embodiments.

Referring to FIG. 9, a server 401 and nodes 403, 405, and 411 are depicted.

The server 401 may operate as a central system, and perform a create transaction to initially generate a key. In the following, the transaction for generating the key may be referred to as the create transaction. The server 401 performs the create transaction to generate a key, and propagates the create transaction destined for the node 403 to every node 403, 405, and 411. The node 403 may be, for example, a user's electronic device. The node 405 may be, for example, a vehicle. The node 411 may be, for example, another user's electronic device.

The nodes 403, 405, and 411 may verify whether the received create transaction is a valid transaction, and propagate a verification result to the other node.

Specifically, the nodes 403, 405, and 411 gather and verify valid transactions, and determine whether they satisfy a block data generation condition. If satisfying the block data generation condition, the nodes 403, 405, and 411 may link previously generated block data (e.g., linking may include information extracted from the previous block data into a new block), and generate new block data including the valid transactions.

If any one of the nodes 403, 405, and 411 generate block data first, the node first generating the block data may propagate the generated block data to the other node. For example, if the node 411 first generates the block, the node 411 may propagate the generated block data to the node 403, the node 405 and the server 401. The node 403, the node 405 and the server 401 may receive and verify the generated block data, and register as the latest block data if the generated block data passes the verification. At this time, the server 401 may identify that the create transaction is normally included in the block data, and finish the initial generation work.

Figure 10:
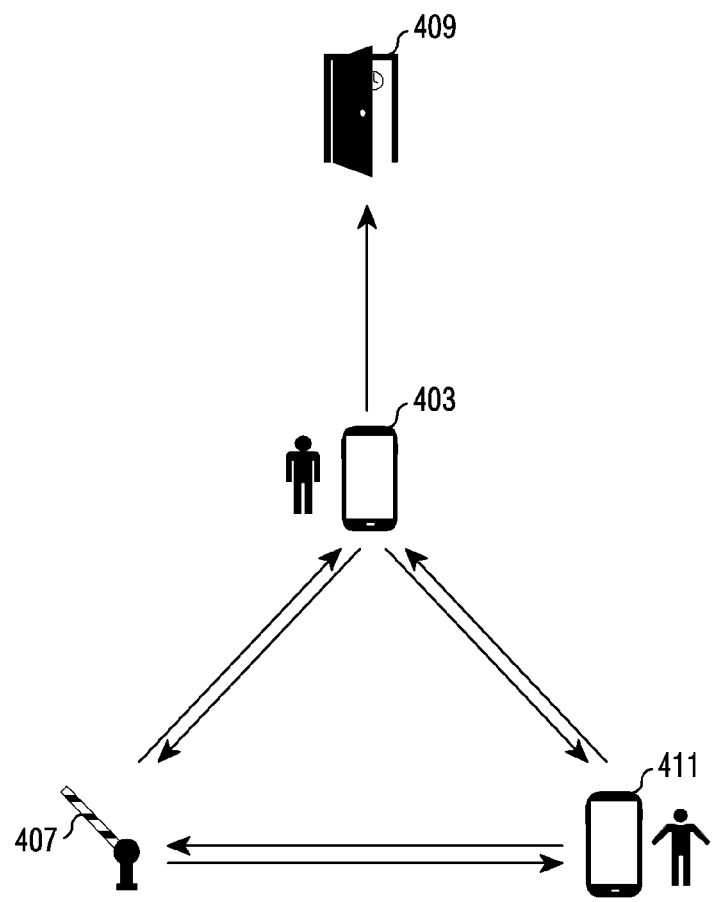
FIG. 10 illustrates an example of a transaction of an electronic device accessing a key according to various embodiments.

FIG. 10 illustrates an example of a transaction of an electronic device 403 accessing a key according to various embodiments.

An access transaction may access a door using a key. That is, the door may be opened with the key.

Referring to FIG. 10, a user's electronic device 403, a barrier 407, another user's electronic device 411 and a door 409 are depicted. For ease of explanations, it is assumed and described that the user opens the door with the key.

The electronic device 403, the barrier 407, the door 409, and the another user's electronic device 411 may operate as nodes. That is, if the user approaches the door 409 using the key embedded in the electronic device 403, each node 407, 409, and 411 may verify the access transaction generated at the user's electronic device 403.

If the user opens the door 409 using the key stored in the user's electronic device 403, the electronic device 403 generates the access transaction. The electronic device 403 propagates the generated access transaction to the node 407, the node 409 and the node 411 which are communicatively connected.

The node 407, the node 409 and the node 411 verify whether the received access transaction is a valid transaction, and propagate a verification result to the other node. In so doing, the door 409 opens the door 409 after identifying whether the received access transaction is verified by the nodes over a specific rate. If the door 409 is not an electronic door, a system of the user's electronic device 403 may open the door instead. For example, if the verification is finished, the system of the user's electronic device 403 may open key information of the door 409 with a communication method (BT, BLE, MST, NFC, etc.) of the door 403.

The nodes 403, 407, and 411 may gather and verify valid transactions, identify whether they satisfy a block data generation condition, and then generate new block data. The process for generating and propagating the block data is the same as described in FIG. 9 and thus omitted.

Figure 11:
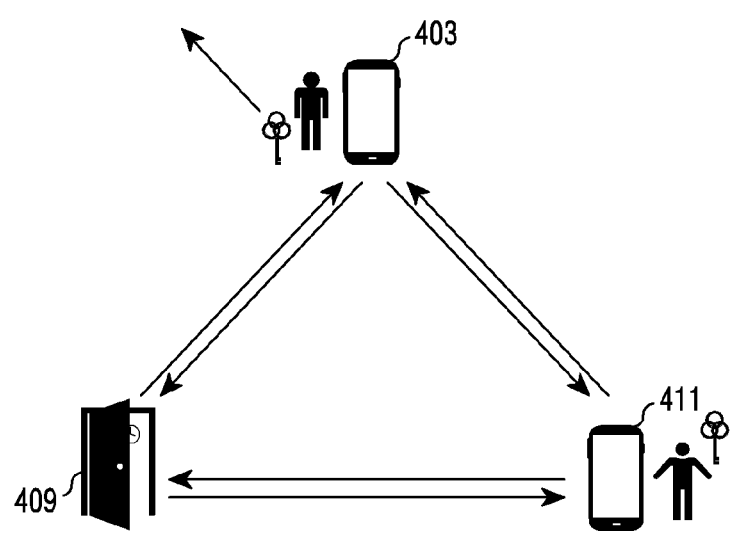
FIG. 11 illustrates an example of a process of an electronic device for sharing, delegating and returning a key in various embodiments.

FIG. 11 illustrates an example of a process of an electronic device 403 for sharing, delegating, and returning a key in various embodiments.

Referring to FIG. 11, nodes 403, 409, and 411 are depicted.

For example, the node 403 may be a user's electronic device. The node 409 may be a door. The node 411 may be another user's electronic device.

If the electronic device 403 shares a key, the electronic device 403 may generate a share transaction including the key and a key share condition.

For example, if sharing the key with the other electronic device 411, the electronic device 403 may verify the share transaction by propagating the generated share transaction to the nodes 409 and 411. Specifically, the electronic device 403 propagates to the nodes 409 and 411 the share transaction which sets the receiver to the electronic device 411 to share the key with itself 403, and the node 409 and the node 411 verify the received share transaction and then propagate a validation result to the other node. The nodes 403, 409, and 411 may gather and verify valid transactions, determine whether they satisfy a block data generation condition, and then generate new block data. The process for generating and propagating the block data is the same as described above in FIG. 9 and thus omitted.

If identifying that the block data including the share transaction is generated, the electronic device 403 may share the key with the another user's electronic device 411. The electronic device 411 sharing the key may use the key by setting key base of the corresponding key with the transaction. At this time, the electronic device 403 may also use the key base of the corresponding key based on the transaction.

If the electronic device 403 delegates the key, the electronic device 403 may generate a delegate transaction including the key and a key delegate condition.

For example, if delegating the key to the other electronic device 411, the electronic device 403 may verify the delegate transaction by propagating the generated delegate transaction to the nodes 409 and 411. Specifically, the electronic device 403 propagates the delegate transaction to the nodes 409 and 411, and the node 409 and the node 411 verify the received delegate transaction and then propagate a verification result to the other node. The node 403, 409, and 411 may gather and verify valid transactions, determine whether they satisfy a block data generation condition, and then generate new block data. The process for generating and propagating the block data is the same as described above in FIG. 9 and thus omitted.

The electronic device 403 may transmit the key to the another user's electronic device 411 based on the verification results received from the node 409 and the node 411, transmit the key, and then remove the key stored in the memory or reduce the valid share count. If the electronic device 403 delegates the key to the another user's electronic device 411, the electronic device 403 may lose the share right corresponding to the key delegate count. For example, assuming that the valid key count is '5, if the electronic device 403 delegates the key, the valid key count of the electronic device 403 is reduced to '4'. In addition, if the remain valid key count after the electronic device 403 delegates the key is '0', the electronic device 403 removes the key.

If the electronic device 403 returns the key, the electronic device 403 may generate a return transaction including the key and a key return condition.

For example, if returning the key which was shared from the other electronic device 411, the electronic devices 403 may verify the return transaction by propagating the generated return transaction to the nodes 409 and 411. Specifically, the electronic device 403 propagates the return transaction to the nodes 409 and 411, and the node 409 and the node 411 verify the received return transaction and then propagate a verification result to other node. The node 403, 409, and 411 may gather and verify valid transactions, determine whether they satisfy the block data generation condition, and then generate new block data. The process for generating and propagating the block data is the same as described above in FIG. 9 and thus omitted.

If identifying that the block data including the return transaction is generated, the electronic device 403 may return the key to the electronic device 411 which has shared key. The electronic device 403 returning the key loses the access right corresponding to the valid count of the key. If no valid count of the key remains, the key may be removed from the electronic device 403. In addition, the electronic device 411 receiving the key may lose the access right corresponding to the valid count of the returned key.

If the key is shared, delegated, and returned, all of the people and the receiver who have the right of the corresponding key may be recorded as the receivers. For example, if the electronic device 403 shares the key to the other electronic device 411, if the other node 409 including the electronic device 403 which is the sender has the right of the corresponding key, the share receiver may record all of the electronic device 403 which is the sender, the node 409 having the right, and the electronic device 411 which is the receiver.

Figure 12:
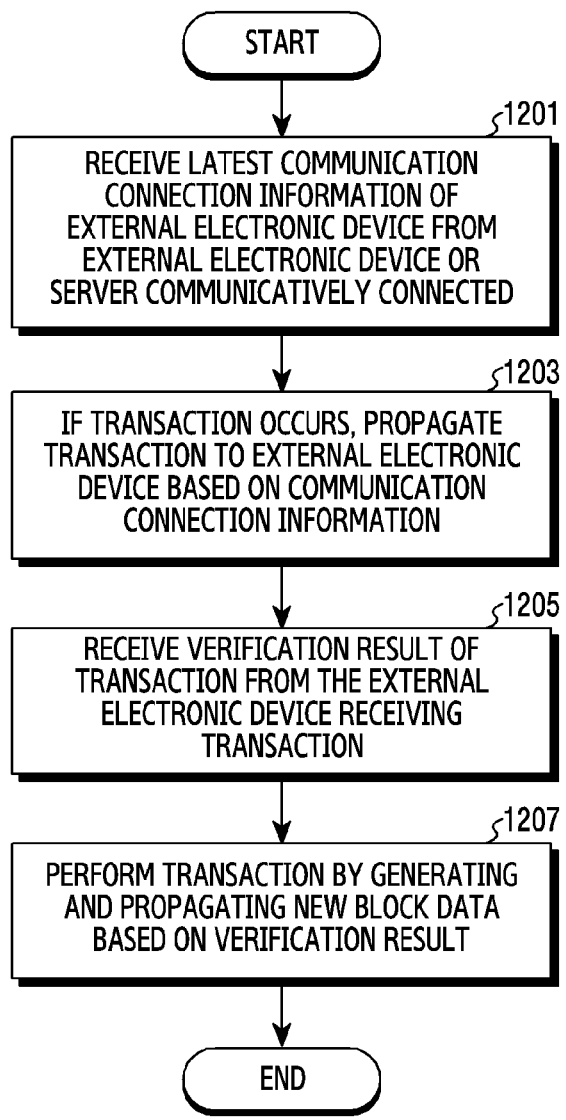
FIG. 12 illustrates a process of an electronic device for conducting a transaction according to various embodiments.

FIG. 12 illustrates a process of an electronic device for conducting a transaction according to various embodiments.

The electronic device may be communicatively connected with a server and an external electronic device, and the electronic device may receive the latest communication connection information of the external electronic device from the external electronic device or the server communicatively connected (operation 1201). The communication connection information is, for example, unique ID information for identifying the electronic device on a communication network, and may include an internet protocol (IP) address, a media access control (MAC) address and/or a device name. If the electronic device is connected to the external electronic device or the server, the external electronic device or the server may receive ID information of the electronic device from the electronic device, and store the ID information of the electronic device. Also, if the external electronic device is connected to other external electronic device or the server, the other external electronic device or the server may receive ID information of the external electronic device from the external electronic device, and store the ID information of the external electronic device. If the electronic device or the server connected on the network is connected with a specific electronic device, it may maintain ID information of the external electronic device as the latest communication connection information, by exchanging the stored ID information of the external electronic device with the connected electronic device. The server may also notify and add its ID information to the electronic device connected on the network. The server may generate a create transaction while initially generating a key and then propagate the create transaction to the electronic device. The transaction may include key information. In addition, the transaction may include transaction create time. Further, the transaction may include position information for using the key. The position information may be, for example, latitude and longitude of a particular area. In addition, the transaction may include a key share count.

If a transaction occurs, the electronic device may propagate the transaction to the external electronic device based on the communication connection information (operation 1203). Specifically, the electronic device may receive the communication connection information of the external electronic device from the external electronic device or the server communicatively connected, extract the communication connection information for connecting to the external electronic device, for example, the IP address of the external electronic device, and propagate the transaction to the external electronic device using the IP address. The external electronic device may verify and store the received transaction in the memory according to a verification result.

If a transaction occurs, the electronic device may receive the verification result of the transaction from the external electronic device which receives the transaction (operation 1205). The transaction may include access, share, delegate, and return of the key.

If a transaction occurs in the electronic device, the electronic device may generate a transaction and propagate the generated transaction to the external electronic device. The external electronic device may verify the transaction received from the electronic device using block data stored in the memory, and propagate a verification result to other electronic device. The electronic device may receive the verification result from the external electronic device, and determine validity of the transaction based on the verification result of the transaction.

The electronic device may generate and propagate new block data based on the verification result and thus determine whether to perform the transaction (operation 1207).

The electronic device may conduct or ignore the transaction according to the verification result received from the external electronic device. The electronic device and the external electronic device may generate block data by adding the verified transaction to the block data to newly generate. The electronic device may propagate the generated block data to the external electronic device.

Figure 13:
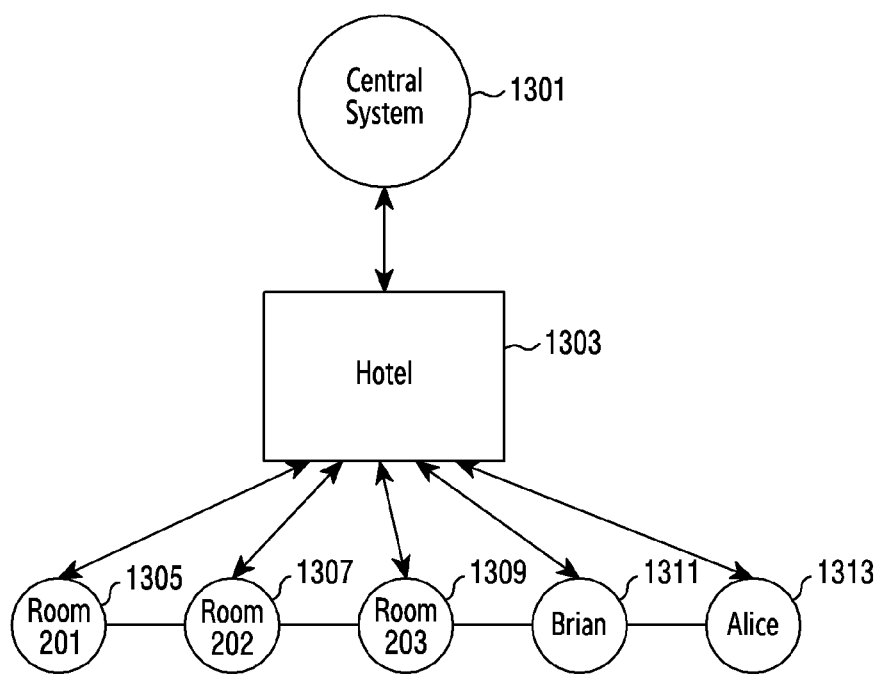
FIG. 13 illustrates an example of a transaction for delegating a key from a hotel to a guest.

FIG. 13 illustrates an example of a transaction for delegating a key from a hotel to a guest.

Referring to FIG. 13, a central system 1301, a hotel 1303, a room201 1305, a room202 1307, a room203 1309, Brian 1311 and Alice 1313 are depicted.

The central system 1301 may be, for example, a server for managing keys.

The hotel 1303 may be, for example, a server for managing hotel rooms.

The room201 1305 may be, for example, a door lock of the room201.

The room202 1307 may be, for example, a door lock of the room202.

The room203 1309 may be, for example, a door lock of the room203.

Brian 1311 may be an electronic device of a hotel guest Brian.

Alice 1313 may be an electronic device of a hotel guest Alice.

The hotel 1303, the room201 1305, the room202 1307, and the room203 1309 may operate as nodes. Brian 1311 and Alice 1313 may operate as nodes from participating in the system.

The central system generates a 'create transaction' for generating a key of each room 1305, 1307, and 1309, and propagate to every node.

All of the nodes 1305, 1307, and 1309 receive the 'create transaction', verify the 'create transaction', propagate a verification result to other nodes, and then add to new block data to generate.

If the new block data is generated, the hotel 1303 may have rights to share, use, and delegate the key of each room 1305, 1307, and 1309.

If Brian reserves the room203 1309 of the hotel 1303, the hotel 1303 may generate a 'delegate transaction' destined for Brian 1311 and propagate it to every node 1305, 1307, 1309, and 1311. The 'delegate transaction' may include a hotel reservation period as time information. For example, if Brian reserves the hotel from 24 Dec. 2016 to 27 Dec. 2016, the reservation period may be included as the time information.

Each node 1305, 1307, 1309, and 1311 may receive and verify the 'delegate transaction', propagate a verification result to the other nodes, and then add to new block data to generate.

If the new block data is generated, Brian 1311 may have rights to share, use, and delegate the key of the room203 1309 from 24 Dec. 2016 to 27 Dec. 2016.

Meanwhile, Brian (1311) may receive the key from the hotel 1303, access to the room203 1309, and thus generate an 'access transaction' to release the door lock of the room203 1309.

As Brian 1311 generates the 'access transaction', 'access transaction' may be generated and the generated block data may be transmitted to the nodes 1303, 1305, 1307, 1309, and 1311. The nodes 1303, 1305, 1307, 1309, and 1311 may verify whether the 'access transaction' is valid, and the room203 1309 may unlock the door based on a verification result.

Meanwhile, if Brian 1311 generates a 'share transaction' to share the key with Alice 1313, the transaction may be generated by entering the sender Brian 1311 and the receiver Alice 1313 in the receiver, and the generated 'share transaction' may be propagated to the nodes 1303, 1305, 1307, 1309, 1311, and 1313. The nodes 1303, 1305, 1307, 1309, 1311, and 1313 may verify whether the 'share transaction' is valid, propagate a verification result to other nodes, and then add new block data to generate. If the new block data is generated, Alice 1313 may share the key.

Meanwhile, if the hotel reservation period elapses, a 'return transaction' may be generated at Brian 1311 and Alice 1313 and be propagated to the nodes 1303, 1305, 1307, 1309, 1311, and 1313.

Figure 14:
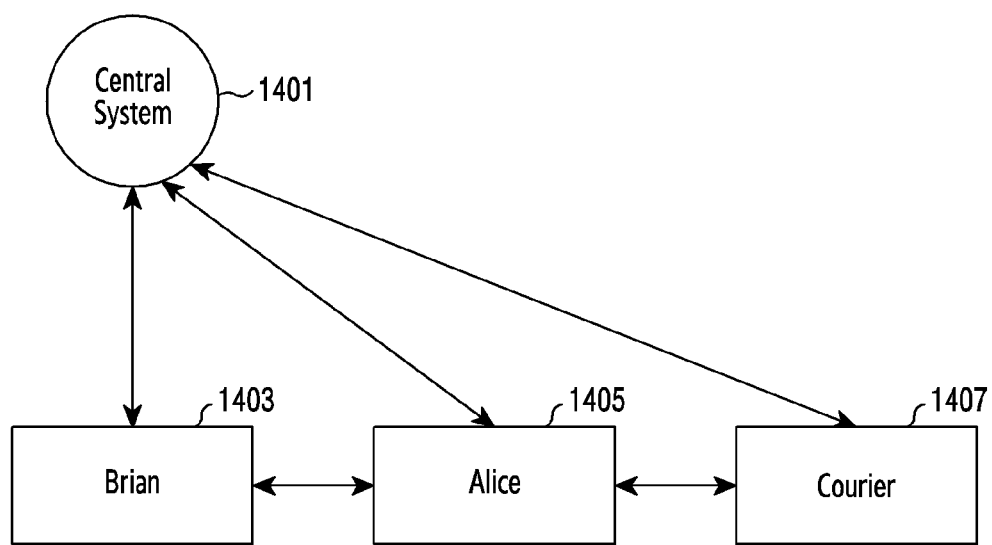
FIG. 14 illustrates an example of sharing a key with other user.

FIG. 14 illustrates an example of sharing a key to other user.

Referring to FIG. 14, a central system 1401, Brian 1403, Alice 1405 and a courier 1407 are depicted.

The central system 1401 may be, for example, a server for managing keys.

Brian 1403 may be, for example, an electronic device of Brian.

Alice 1405 may be, for example, an electronic device of Alice.

The courier 1407 may be, for example, an electronic device of the courier.

The central system 1401 may be communicatively connected with a plurality of electronic devices (not shown), and the plurality of the electronic devices may operate as nodes for verifying a generated transaction.

The plurality of the electronic devices may verify the generated transaction and generate and propagate block data other nodes. In addition, Brian 1403 and Alice 1405 may also operate as nodes.

The central system 1401 may generate a first create transaction destined for Brian 1403 to transmit a vehicle key to Brian 1403, and propagate the first create transaction to the plurality of the nodes. The node receiving the first create transaction may receive and verify the first create transaction, propagate to other nodes, and add to new block data to generate. As the new block data is generated, Brian 1403 may have rights to share, use, and delegate his vehicle key.

The central system 1401 may generate a second create transaction destined for Alice 1405 to transmit a vehicle key to Alice 1405, and propagate the second create transaction to the plurality of the nodes. The node receiving the second create transaction may receive and verify the second create transaction, propagate to other nodes, and add to new block data to generate. As the new block data is generated, Alice 1405 may have rights to share, use, and delegate her vehicle key.

Meanwhile, Alice 1405 may propagate a 'share transaction' to the plurality of the nodes in order to share her vehicle key with Brian 1403. The transaction may include information of a valid period as a share condition. For example, Alice 1405 may generate a 'shared transaction' by adding '1 day' as the share condition. The plurality of the nodes verifies the received 'share transaction', propagates the verification result to other nodes, and then adds to new block data to generate. If the new block data is generated, Alice 1405 may share her vehicle key with Brian 1403.

Brian 1403 may generate an 'access transaction' to access the vehicle of Alice 1405 using the shared vehicle key of Alice 1405, and propagate it to the plurality of the nodes. The plurality of the nodes verifies the received 'access transaction', propagates the verification result to other nodes, and then adds to new block data to generate. If the new block data is generated, Brian 1403 may perform the 'access transaction'.

Meanwhile, Brian 1403 may generate a 'share transactions' destined for the courier 1407 to temporarily share the key vehicle with the courier 1407, and propagate it to the plurality of the nodes. Information such as 'one valid access' valid access between 14:10~14:30 on 1 February, 'access only to trunk' may be included as the share condition.

The plurality of the nodes verifies the received 'share transaction', propagates the verification result to other nodes, and then adds to new block data to generate. If the new block data is generated, Brian 1403 may share block data including the share condition with the courier 1407, and the courier 1407 may restrictively use the key based on the information included in the share condition. If the courier 1407 restrictively finishes the key use according to the share condition, the courier 1407 may generate and propagate a 'return transaction' to the nodes.

The term "module", as used herein, includes a unit configured to hardware, software, or firmware. The term "module" can be interchangeably used with terms such as "logic", "logical block", "component", "circuit", or the like. A module can be an integral component, or a minimum unit for performing one or more functions or may be a part thereof. A module can be mechanically or electrically implemented. For example, a module, according to an embodiment of the present disclosure, can include an Application-Specific Integrated Circuit (ASIC) chip, a Field-Programmable Gate Arrays (FPGAs), or a programmable-logic device, which are known or will be developed and which perform certain operations. At least some parts of a device (e.g., modules or functions thereof) or a method (e.g., operations), according to embodiments of the present disclosure, can be implemented with an instruction stored in a non-transitory computer-readable storage medium (e.g., the memory 130) as a program module. When the instruction is executed by a processor (e.g., the processor 120), the processor can perform a function corresponding to the instruction. The non-transitory computer readable recording medium can include, for example, a hard disk, a floppy disc, a magnetic medium (e.g., a magnetic tape), an optical storage medium (e.g., a Compact Disc-ROM (CD-ROM) or a DVD, a magnetic-optic medium (e.g., a floptical disc)), and an internal memory. The instruction can include code created by a compiler or code executable by an interpreter. The module or program module can further include at least one or more components among the aforementioned components, or can omit some of them, or can further include additional other components. Operations performed by a module, program module, or other components of the various embodiments of the present disclosure can be executed in a sequential, parallel, repetitive, or heuristic manner. In addition, some of the operations can be executed in a different order or may be omitted, or other operations may be added.

The invention claimed is:

1. An electronic device comprising:
a communication unit for communicating with a server and at least one external electronic device; and
a processor electrically coupled with the communication unit,
wherein the processor is configured to:
receive latest communication connection information of the external electronic device from the external electronic device or the server through the communication unit;
in response to a transaction occurring, propagate the transaction to the external electronic device based on the latest communication connection information;
receive a verification result of the transaction from the external electronic device that receives the transaction; and
perform the transaction by generating and propagating new block data based on the verification result,
wherein the block data comprises one or more transactions,
wherein the transaction includes information related to a smart-key, and
wherein the transaction includes at least one of access, share, delegate or return of the smart-key.

2. The electronic device of claim 1, wherein the block data comprises at least one of create time of the block data, version information of rules which the block data follows, a hash value of previous block data, or a hash value of current block data.

3. The electronic device of claim 1, wherein the electronic device generates block data by adding the verified transaction into new block data to generate, and propagates the generated block data to the external electronic device.

4. The electronic device of claim 1, wherein the transaction comprises version information of a rule which the transaction follows.

5. The electronic device of claim 4, wherein the electronic device proves that there is no alteration in the transaction using the information representing the transaction.

6. The electronic device of claim 4, wherein the transaction further comprises position information for using the smart-key.

7. The electronic device of claim 4, wherein the transaction further comprises share count of the smart-key.

8. The electronic device of claim 4, wherein the transaction further comprises at least one of information for searching for a transaction which receives the smart-key, or information for searching for a previous transaction.

9. The electronic device of claim 4, wherein the transaction further comprises information representing the transaction.

10. The electronic device of claim 1, wherein the smart-key is generated based on the processor receiving a create transaction for generating the smart-key from the server through the communication unit, and verifying whether the create transaction is a valid transaction.

11. A transaction performing method of an electronic device, comprising:

receiving block data comprising latest communication connection information of an external electronic device from the external electronic device or a server;

in response to a transaction occurring, propagating the transaction to the external electronic device based on the latest communication connection information;

receiving a verification result of the transaction from the external electronic device which receives the transaction; and performing the transaction by generating and propagating new block data based on the verification result, wherein the block data comprises one or more transactions, wherein the transaction includes information related to a smart-key, and wherein the transaction includes at least one of access, share, delegate or return of the smart-key.

12. The transaction performing method of the electronic device of claim 11, wherein the transaction includes version information of a rule that the transaction follows.

13. The transaction performing method of the electronic device of claim 11, wherein the transaction comprises at least one of create time of the transaction, position information for using the smart-key, or access or share count of the smart-key.

14. The transaction performing method of the electronic device of claim 11, wherein performing the transaction comprises:
generating the block data by adding the verified transaction into new block data to generate; and
propagating the generated block data to the external electronic device.

15. The transaction performing method of the electronic device of claim 14, wherein performing the transaction performs the transaction by identifying that the block data is propagated.

16. The transaction performing method of the electronic device of claim 11, further comprising:
by sharing, delegating or returning the transaction, distributing and managing rights by generating another new transaction in the distributed rights.

17. The transaction performing method of the electronic device of claim 16, wherein managing manages the smart-key without modifying existing block data or an existing transaction.

18. The transaction performing method of the electronic device of claim 11, wherein the transaction comprises receiver information, and sets one or more receivers.

19. The transaction performing method of the electronic device of claim 18, wherein, in response to several receivers being set, the method manages the smart-key in common.

* * * * *